United States Patent
Majdak

[11] 3,766,682
[45] Oct. 23, 1973

[54] FISHING LURE
[76] Inventor: Louis Majdak, 29919 Greater Mack, St. Clair Shores, Mich.
[22] Filed: May 19, 1972
[21] Appl. No.: 254,948

[52] U.S. Cl............. 43/42.14, 43/42.2, 43/42.51
[51] Int. Cl............................................. A01k 85/00
[58] Field of Search.............. 43/42.14, 42.19, 43/42.2, 42.51

[56] References Cited
UNITED STATES PATENTS

| | | | |
|---|---|---|---|
| 2,516,434 | 7/1950 | Swan | 43/42.14 |
| 2,472,639 | 6/1949 | Wickens | 43/42.14 X |
| 574,561 | 1/1897 | McMullin | 43/42.51 |
| 801,649 | 10/1905 | Coffin | 43/42.51 |

Primary Examiner—Louis G. Mancene
Assistant Examiner—Daniel J. Leach
Attorney—William L. Fisher

[57] ABSTRACT

A fishing lure comprising a spring wire body having a plurality of objects each axially slidable thereon including at least one spinning disk rotatably carried on said wire body, said disk having fins thereon by which said disk spins in water when said lure is pulled therethrough, said disk being substantially flat planar except for pitched fins formed about the circumference thereof, said fins extending substantially continuously about said circumference.

10 Claims, 5 Drawing Figures

Patented Oct. 23, 1973
3,766,682
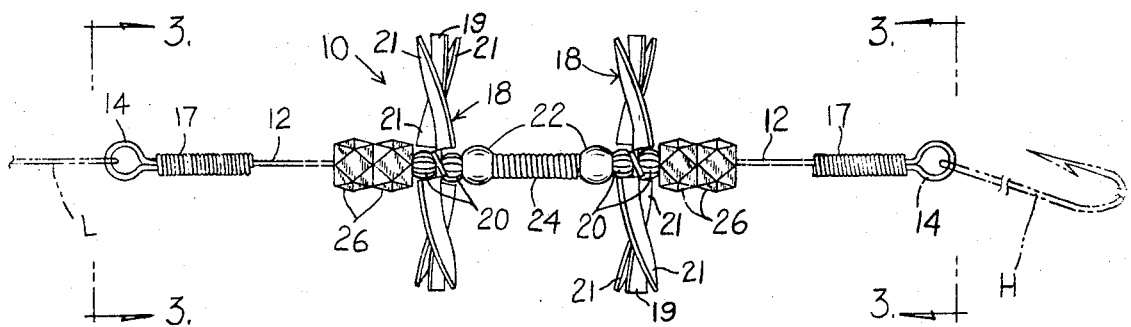
FIG-1
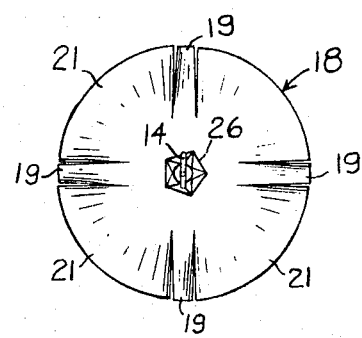
FIG-3
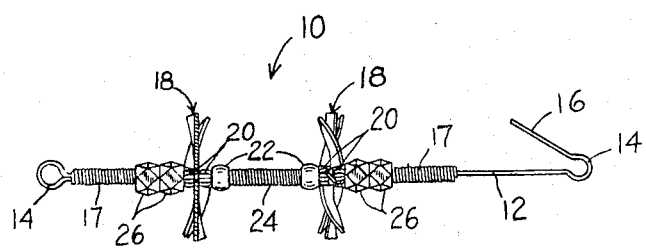
FIG-2
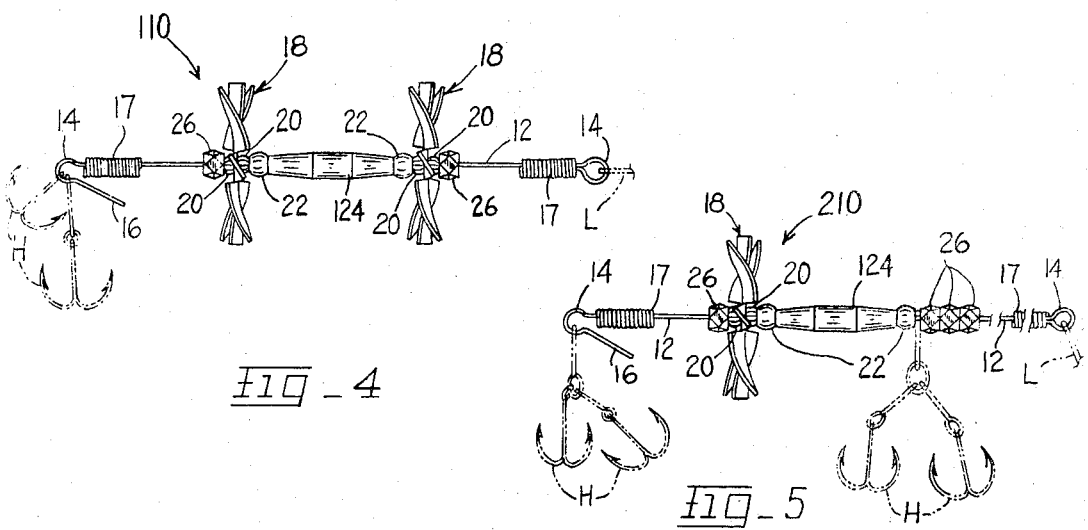
FIG-4
FIG-5

FISHING LURE

My invention relates to fishing.

The principal object of my invention is the provision of a fishing lure which has a desirable and advantageous construction from the standpoint of manufacturing and use and particularly an attractive motion in water.

The foregoing object of my invention and the advantages thereof will become apparent during the course of the following description, taken in conjunction with the accompanying drawings, in which:

FIGS. 1, 2 and 3 are, respectively, front and end elevational views of a fishing lure embodying my invention; and FIGS. 4 and 5 are, respectively, front elevational views of two other embodiments of my invention.

Referring to the drawings in greater detail and first to FIGS. 1–3, 10 generally designates said embodiment shown therein which comprises a spring wire body 12 having a straight principal portion and opposite ends thereof each reversely bent into a loop 14, and a pair of tubular members 17 each preferably in the form of a coiled tension spring and normally holding one of said loops 14 closed. A leg 16 of each loop 14 is captured in the respective tension spring 17 to hold said loop 14 closed. Each tubular member 17 is slidable axially inwardly of the respective loop 14 for releasing the same to allow it to spring open. Said embodiment further comprises a pair of spinning disks 18 rotatable and axially slidable on said body 12 inwardly of said tension springs 17 each having a plurality of fins 19 and 21 formed therein by which said disk spins in water as the fishing lure 10 is pulled therethrough. Each disk 18 is preferably formed of metal and is continuous around its circumference except for having alternately narrow and wide fins 19 and 21, respectively, cut therefrom. Each said fin is disposed at an acute angle in respect to the body of said disk 18 and extends on opposite sides thereof. A pair of thrust bearings in the form of beads 20 are rotatable and axially slidable on said body 12, one on each side of a disk 18. Other beads 22 and 26 and a third tubular member 24 are rotatable and axially slidable on said body 12 and serve as spacers. At least one bead 22 or 26 is disposed adjacent each thrust bearing 20. Said third tubular member is disposed between said disks 18. A hook H may be affixed to one end of the lure 10 and a fishing line L to the other end thereof and when the lure 10 is pulled through water the disks 18 spin and set up water currents and with the other objects 17, 22, 24 and 26 glisten in the water and attract fish thereto.

Referring to FIGS. 4 and 5, the embodiments of fishing lures shown therein are designated 110 and 210, respectively, and show hooks H variously carried thereon. The third tubular member 124 in each said embodiment 110 and 210 is in the form of a solid walled object which may be molded or cast. A single disk 18 is employed in the embodiment 210.

It will thus be seen that there has been provided by my invention a fishing lure in which the object hereinabove set forth, together with many thoroughly practical advantages, has been successfully achieved. While a preferred embodiment of my invention has been shown and described it is to be understood that variations and changes may be restored to without departing from the spirit of my invention as defined by the appended claims.

What I claim is:

1. A fishing lure comprising a spring wire body having a plurality of objects each axially slidable thereon including at least one spinning disk rotatably carried on said wire body, said disk having fins thereon by which said disk spins in water when said lure is pulled therethrough, said disk being substantially flat planar except for pitched fins formed about the circumference thereof, said fins extending substantially continuously about said circumference.

2. A fishing lure as claimed in claim 1, an end thereof reversely bent and forming a loop, at least one of said objects being a tubualr member normally holding said loop closed, a leg of said loop held in said tubular member, said tubular member slidable axially inwardly of said loop for releasing said leg to allow the latter to spring open.

3. A fishing lure as claimed in claim 1, each of opposite ends thereof reversely bent and forming respective loops, at least two of said objects being two tubular members normally holding said loops closed respectively, a leg of each said loop held in the respective tubular member, each said tubular member slidable axially inwardly of the respective loop for releasing the respective leg to allow the latter to spring open.

4. A fishing lure as claimed in claim 2, said leg and said tubular member being of substantially equal length, the length of said wire body being substantially filled with said objects except for the space required for said axial sliding of said tubular member to hold or release said leg.

5. A fishing lure as claimed in claim 2, said tubular member a coiled tension spring.

6. A fishing lure as claimed in claim 3, at least one of said objects being a third tubular member serving as a spacer.

7. A fishing lure as claimed in claim 1, said fins being alternately narrow and wide fins formed about said circumference.

8. A fishing lure as claimed in claim 7, each said fin pitched at an acute angle in respect to the body of said disk.

9. A fishing lure as claimed in claim 1, at least one of said objects being a second disk constructed identically to said first-mentioned disk.

10. A fishing lure as claimed in claim 9, at least one of said objects a tubular member serving as a spacer between the two disks.

* * * * *